UNITED STATES PATENT OFFICE 2,510,173

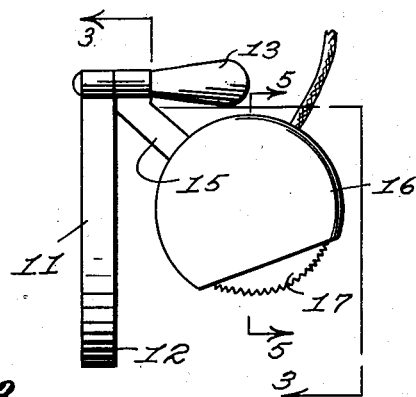
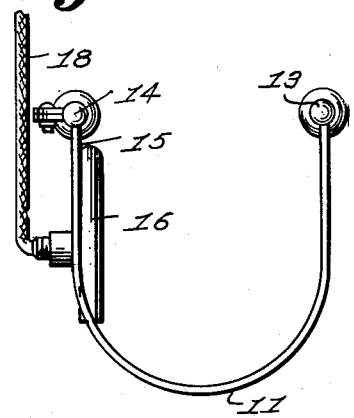
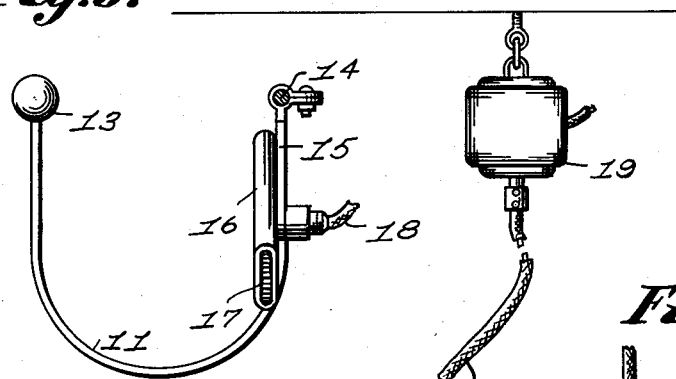
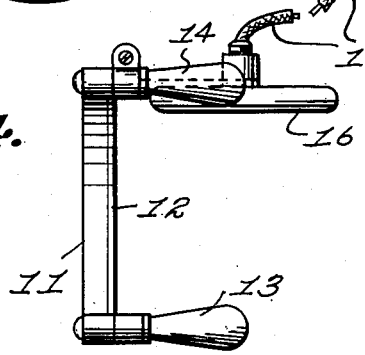
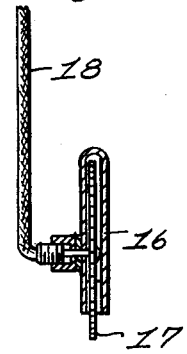
INVENTOR.
Harold R. Harter
BY
McMorrow, Berman & Davidson
ATTORNEYS

COMBINATION LOIN KNIFE AND ELECTRIC SCRIBE

Harold R. Harter, Austin, Minn.

Application April 23, 1948, Serial No. 22,898

3 Claims. (Cl. 17—1)

This invention relates to meat cutting implements, and more particularly to a combined device for scribing a side of meat to cut through the ribs thereof and removing the loin therefrom.

A main object of the invention is to provide a novel and improved implement useful in meat packing, such as in cutting up hog carcasses, whereby a single operator is enabled to scribe the loin, dividing the loin and rib, and to remove the loin from the carcass, a task heretofore requiring at least two operators.

A further object of the invention is to provide an improved combination loin knife, and scribe for use in trimming hog carcasses and the like, the device being simple in construction, easy to operate, reducing the amount of time and labor required to remove the loin from the carcass, reducing waste, and improving the appearance of the product.

Further objects and advantages of the invention will become apparent from the following description and claims, and from the accompanying drawings, wherein:

Figure 1 is a side elevational view of a combined scriber and loin cutting knife constructed in accordance with the present invention.

Figure 2 is a rear elevational view of the implement of Figure 1.

Figure 3 is a cross-sectional view taken on line 3—3 of Figure 1.

Figure 4 is a top plan view of the implement of Figure 1.

Figure 5 is a cross-sectional detail view taken on line 5—5 of Figure 1.

Referring to the drawings, 11 designates a generally U-shaped loin cutting blade whose cutting edge is shown at 12. Secured to the ends of blade 11 are the respective handles 13 and 14 enabling the operator to draw the blade 11 through the carcass of a hog or other slaughtered animal to remove the loin therefrom.

Pivotally secured to the shank of one of the handles, such as the handle 14 is a depending forwardly inclined bracket arm 15 to which is secured a flat guard housing 16 extending perpendicularly to the plane of blade 11 and having journaled therein a rotary saw blade 17, the housing 16 being open at its bottom and the blade 17 projecting therethrough, as best shown in in Figure 1. Connected to the shaft of blade 17 is a flexible transmission shaft 18 connected to the shaft of an electric motor 19. Motor 19 may be suspended from any convenient support adjacent the operator's station.

In operation, the carcass is scribed, that is, the bones connecting the loin portion to the rib portion of the carcass are severed, by means of the rotary saw 17 at the same time as the U-shaped blade 11 is drawn through the carcass to cut the loin free therefrom. Since the rotary blade 17 is positioned ahead of the loin knife blade edge 12 the scribing and loin cutting action is accomplished by a single forward sweep of the implement.

The pivotal connection of arm 15 to handle 14 allows the rotary blade 17 to be adjusted laterally as required for various sizes and shapes of carcasses, the adjustment being made by the operator's right hand as it grasps handle 14. By moving the arm 15 slightly to the right or left ahead of the blade, the device may be turned to the right or left during the cutting operation in accordance with the shape of the cut desired.

As heretofore practiced, the carcass is scribed in a separate operation preceding the loin cutting operation, and at least two operators are required to scribe the carcass and then cut the loin free. By the use of the implement of the present invention, the scribing of the carcass and the cutting free of the loin are combined in a single operation, speeding up the carcass trimming process and reducing the amount of operators required therefor. The use of the implement also makes for a more uniform loin because it allows the operator pulling the loin from the carcass to decide on the width of loin to be pulled.

While a specific embodiment of a combined carcass scribing and loin cutting implement has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A combined carcass scribing and loin cutting implement comprising a generally U-shaped cutting blade, handles carried at the ends of said blade, a depending bracket secured to one of the handles forwardly of the blade cutting edge, and a rotary saw blade carried by said bracket, said saw blade being substantially perpendicular to the plane of the U-shaped blade and being substantially longitudinally aligned with the side of said U-shaped blade to which the bracket is secured.

2. A combined carcass scribing and loin cutting implement comprising a generally U-shaped cutting blade, handles carried at the ends of said blade, a depending forwardly-inclined bracket secured to one of the handles, a guard housing secured to said bracket, and a rotary saw blade journaled in said guard housing, said saw blade being substantially perpendicular to the plane of the U-shaped blade and being substantially longitudinally aligned with the side of said U-shaped blade to which the bracket is secured.

3. A combined carcass scribing and loin cutting implement comprising a generally U-shaped cutting blade, handles carried at the ends of said blade, a depending forwardly-inclined bracket pivotally secured to one of the handles for lateral adjustment around said one handle, a guard housing secured to said bracket, a rotary saw blade journaled in said guard housing, said saw blade being substantially vertical and longitudinally aligned with the side of said U-shaped blade to which the bracket is connected but being laterally adjustable in response to the pivoting of said bracket, a flexible shaft connected to the axis of said saw blade, and an electric motor connected to said flexible shaft.

HAROLD R. HARTER.

REFERENCES CITED

The following references are of record in the file of this patent:

UNITED STATES PATENTS

| Number | Name | Date |
| --- | --- | --- |
| 431,097 | Wilder | July 1, 1890 |
| 1,588,744 | Keane | June 15, 1926 |
| 1,616,058 | Meyer | Feb. 1, 1927 |